United States Patent
Ortiz Egea et al.

(10) Patent No.: US 11,029,149 B2
(45) Date of Patent: Jun. 8, 2021

(54) MULTIPATH MITIGATION FOR TIME OF FLIGHT SYSTEM

(71) Applicant: Microsoft Technology Licensing, LLC, Redmond, WA (US)

(72) Inventors: Sergio Ortiz Egea, San Jose, CA (US); Hung-Ming Lin, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/262,440

(22) Filed: Jan. 30, 2019

(65) Prior Publication Data
US 2020/0240781 A1    Jul. 30, 2020

(51) Int. Cl.
| | |
|---|---|
| *G01C 3/08* | (2006.01) |
| *H04N 5/225* | (2006.01) |
| *G06T 5/00* | (2006.01) |
| *G06T 5/50* | (2006.01) |
| *G06T 7/00* | (2017.01) |
| *G06T 5/20* | (2006.01) |

(52) U.S. Cl.
CPC ............... *G01C 3/08* (2013.01); *G06T 5/002* (2013.01); *G06T 5/20* (2013.01); *G06T 5/50* (2013.01); *G06T 7/97* (2017.01); *H04N 5/2256* (2013.01); *G06T 2207/10028* (2013.01); *G06T 2207/10152* (2013.01)

(58) Field of Classification Search
CPC .. G01C 3/08; G06T 5/002; G06T 5/50; G06T 5/20; G06T 7/97; G06T 2207/10028; G06T 2207/10152; H04N 5/2256
See application file for complete search history.

(56) References Cited

U.S. PATENT DOCUMENTS

| | | | |
|---|---|---|---|
| 9,570,874 B1* | 2/2017 | Ghauri | ..................... B41J 2/442 |
| 2007/0285422 A1 | 12/2007 | Nayar et al. | |
| 2011/0287387 A1* | 11/2011 | Chen | ...................... G06T 7/521 |
| | | | 433/215 |

(Continued)

OTHER PUBLICATIONS

Naik, et al., "A Light Transport Model for Mitigating Multipath Interference in Time-of-flight Sensors", In Proceedings of the IEEE Conference on Computer Vision and Pattern Recognition, Jun. 7, 2015, pp. 73-81.

(Continued)

*Primary Examiner* — Tracy Y. Li
(74) *Attorney, Agent, or Firm* — Holzer Patel Drennan

(57) ABSTRACT

A time-of-flight (ToF) system disclosed herein provides a method of a method of separating a direct component of light collected by a time of flight (ToF) detector from a global component of light collected by the ToF detector, the method comprising acquiring three or more images represented by three or more matrices in response to illuminating a target with a light source using a first spatial pattern at three or more different modulation frequencies, acquiring an additional image represented by an additional matrix in response to illuminating the target with the light source using a second spatial pattern, the second spatial pattern being different than the first spatial pattern, and determining one or more parameters of the direct component of light and the global component of light based on analysis of the three or more matrices and the additional matrix.

20 Claims, 11 Drawing Sheets

(56) References Cited

U.S. PATENT DOCUMENTS

| | | | |
|---|---|---|---|
| 2012/0092463 A1* | 4/2012 | Liu | G01B 11/2536 348/50 |
| 2014/0347553 A1 | 11/2014 | Ovsiannikov et al. | |
| 2015/0253429 A1 | 9/2015 | Dorrington et al. | |
| 2016/0334509 A1 | 11/2016 | Gruenwald | |
| 2017/0123067 A1 | 5/2017 | Van Der Tempel | |
| 2018/0040160 A1* | 2/2018 | Moon | G06T 15/06 |
| 2018/0341008 A1 | 11/2018 | Ortiz Egea | |

OTHER PUBLICATIONS

Nayar, et al., "Fast Separation of Direct and Global Components of a Scene using High Frequency Illumination", In Proceedings of ACM Transactions on Graphics (TOG), vol. 25, No. 3, Jul. 30, 2006, 10 pages.

Feigin, et al., "Modeling "wiggling" as a multi-path interference problem in AMCW ToF imaging", In Journal of Optics Express, vol. 23, Issue 15, Jul. 16, 2015, pp. 19213-19225.

Freedman, et al., "SRA: Fast Removal of General Multipath for ToF Sensors", In Proceedings of European Conference on Computer Vision, Sep. 6, 2014, pp. 234-249.

Son, et al., "Learning to Remove Multipath Distortions in Time-of-Flight Range Images for a Robotic Arm Setup", In Technical report TR2016-036, May 2016, 10 pages.

Gupta, et al., "(De) Focusing on Global Light Transport for Active Scene Recovery", In Proceedings of IEEE Conference on Computer Vision and Pattern Recognition, Jun. 20, 2009, 8 pages.

Garces, et al., "Low Cost Decomposition of Direct and Global Illumination in Real Scenes", In proceedings of Spanish Computer Graphics Conference, Jul. 1, 2015, 8 pages.

Rushmeier, et al., "Experiments with a low-cost system for computer graphics material model acquisition", In Journal of in SPIE/IS&T Electronic Imaging, Mar. 2015, 9 pages.

Chandraker, et al., "On the Duality of Forward and Inverse Light Transport", In Journal of IEEE Transactions on Pattern Analysis and Machine Intelligence, vol. 33, Issue 10, Oct. 2011, pp. 1-8.

Tanaka, et al., "Recovering Transparent Shape from Time-of-Flight Distortion", In Proceedings of the IEEE Conference on Computer Vision and Pattern Recognition, Jun. 27, 2016, pp. 4387-4395.

"International Search Report and Written Opinion Issued in PCT Application No. PCT/US18/028978", dated Jul. 16, 2018, 13 Pages.

Fuchs, S., Suppa M., Hellwich O (2013) Compensation for Multipath in ToF Camera Measurements Supported by Photometric Calibration and Environment Integration. In: Chen M., Leibe B., Neumann B. (eds) Computer Vision Systems. ICVS 2013. Lecture Notes in Computer Science, vol. 7963. Springer, Berlin, Heidelberg.

Jimenez, D., et al.: Modelling and correction of multipath interference in time of flight cameras. In: IEEE Conference of Computer Vision and Pattern Recognition (CVPR). (2012) 893-200.

Dorrington, A. A., J. P. Godbaz, M. J. Cree, M. J. Cree, A. D. Payne, A. D. Payne, L. V. Streeter, L. V. Streeter, "Separating true range measurements from multi-path and scattering interference in commercial range cameras", Proc. SPIE 7864, Three-Dimensional Imaging, Interaction, and Measurement, 786404 (Jan. 27, 2011); doi: 10.1117/12.876586; https://doi.org/10.1117/12.876586.

Godbaz, John P., Michael J. Cree, Michael J. Cree, Adrian A. Dorrington, Adrian A. Dorrington, "Closed-form inverses for the mixed pixel/multipath interference problem in AMCW lidar", Proc. SPIE 8296, Computational Imaging X, 829618 (Feb. 10, 2012); doi: 10.1117/12.909778; https://doi.org/10.1117/12.909778.

Kirmani, A., et al.: Spumic: Simultaneous phase unwrapping and multipath interference cancellation in tome-of-flight cameras using spectral methods. In: IEEE International Conference on Multimedia and Expo (ICME). (2013) 1-6.

Falie, D., Buzuloiu, V.: Discance errors correction for the time of flight (ToF) cameras. In: Imaging Systems and Techniques, 2008. IST 2008. IEEE International Workshop on IEEE (2008) 123-126.

Falie, D., Buzuloiu, V.: Further investigations on Tof cameras distance errors and their corrections. In: European Conference on Circuits and Systems for Communications (ECCSC). (2008) 197-200.

"International Search Report and Written Opinion Issued in PCT Application No. PCT/US2019/068929", dated Mar. 19, 2020, 30 Pages.

Fuchs, Stefan, "Multipath Interference Compensation in Time-of-Flight Camera Images", In Proceedings of 20th International Conference on Pattern Recognition, Aug. 23, 2010, pp. 3583-3586.

Whyte, et al., "Resolving Multiple Propagation Paths in Time of Flight Range Cameras Using Direct and Global Separation Methods", In Journal of Optical Engineering, vol. 54, Issue 11, Nov. 24, 2015, 10 Pages.

\* cited by examiner

MULTIPATH MITIGATION FOR TIME OF FLIGHT SYSTEM

BACKGROUND

Time-of-flight (ToF) systems produce a depth image of an object, each pixel of such image encoding the distance to the corresponding point in the object. In recent years, time-of-flight depth-imaging technology has become more accurate and more affordable. These advances are a consequence of improved imaging-array fabrication and intelligent post-processing, which garners improved signal-to-noise levels from the raw output of the array.

SUMMARY

A time-of-flight (ToF) system disclosed herein provides a method of a method of separating a direct component of light collected by a time of flight (ToF) detector from a global component of light collected by the ToF detector, the method comprising acquiring three or more images represented by three or more matrices in response to illuminating a target with a light source using a first spatial pattern at three or more different modulation frequencies, acquiring an additional image represented by an additional matrix in response to illuminating the target with the light source using a second spatial pattern, the second spatial pattern being different than the first spatial pattern, and determining one or more parameters of the direct component of light and the global component of light based on analysis of the three or more matrices and the additional matrix.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTION

Time-of-flight (ToF) systems produce a depth image of an object or a scene, each pixel of such image encoding the distance to the corresponding point in the object or the scent. When a scene is illuminated by a source of light, the radiance of each point in the scene can be viewed as having two components—a direct component and a global component. The term "radiance" and "light," of a point on a surface are used herein interchangeably to refer to the amount of electromagnetic radiation leaving or arriving at that point on the surface. Here the direct component is due to the direct illumination of a point in the scene (referred to as the "scene point") by the source of light and the global component is due to the indirect illumination of the scene point. Such indirect illumination of the scene point may be due to interreflection of light between scene points, subsurface scattering of light within a medium beneath the surface of the scene, volumetric scattering of light, diffusion of light by translucent surface, etc.

Figure 1:
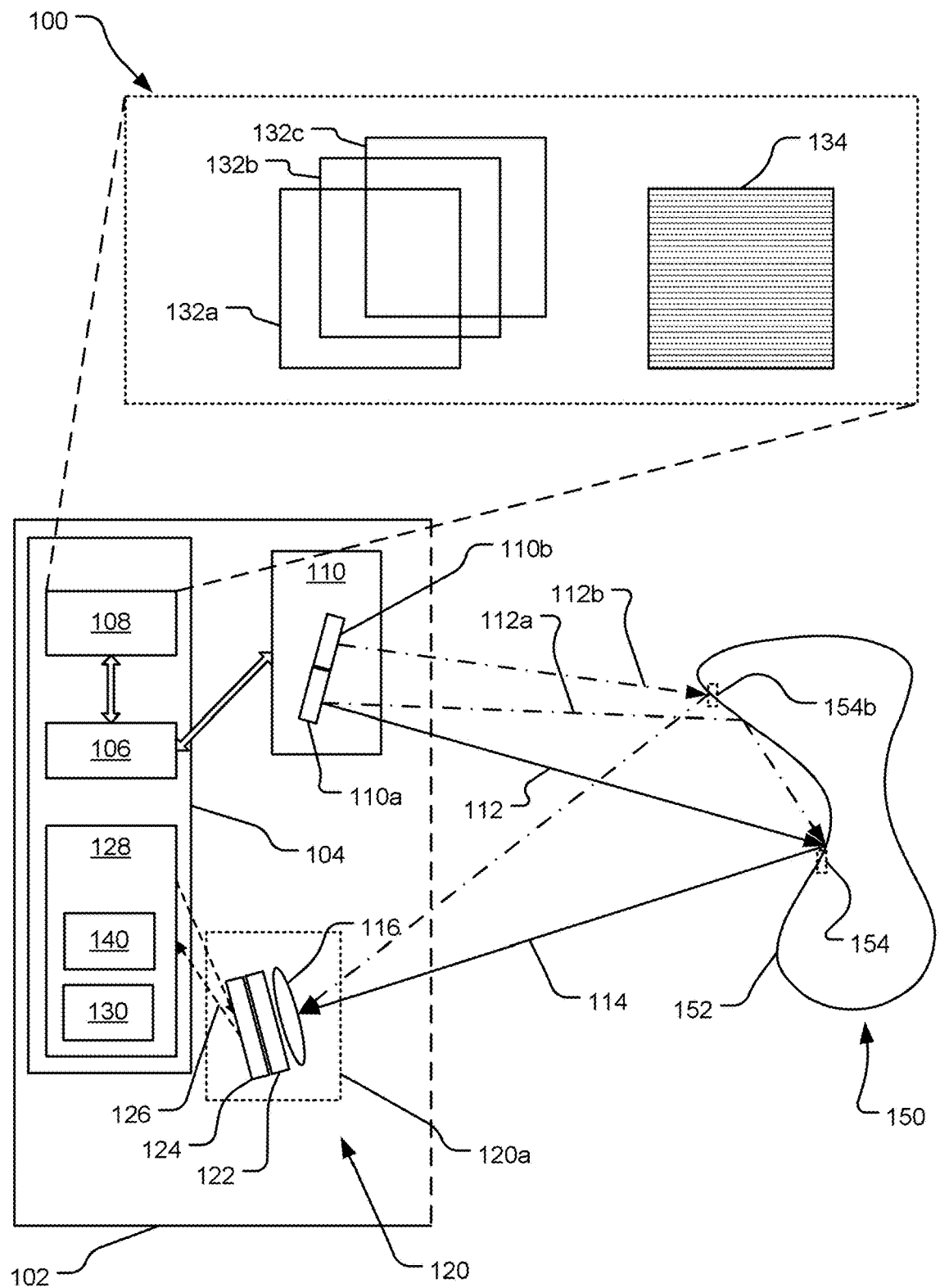
FIG. 1 illustrates an example implementation of the time-of-flight multipath mitigation technology disclosed herein.

FIG. 1 illustrates a ToF system 100 including a ToF module 102 for separating a direct component of light collected by a time of flight (ToF) detector from a global component of light collected by the ToF detector. Specifically, a ToF module 102 may include a computing module 104 that includes a processor 106 and a spatial pattern data store 108. The spatial pattern data store 108 may store one or more spatial patterns, such as spatial patterns 132, 134 that may be used to spatially modulate illumination signal from a light source 110. The light source 110 may be a two-dimensional grid of light source elements, referred to as light source pixels. For example, the light source 110 may be an array of m×n light source elements, each light source element being a laser diode.

In one implementation, the processor 106 may communicate with the light source 110 to cause the illumination signal generated by the light source to be modulated by the spatial patterns 132$a$, 132$b$, 132$c$ (collectively "spatial patterns 132"), and 134. For example, the spatial patterns 132 may be uniform patterns and the spatial pattern 134 is a pattern of horizontal lines. The spatial patterns 132 and 134 are two dimensional patterns that map to the two-dimensional grid of light source elements 110$a$, 110$b$. Additionally, other patterns such as a dot-pattern may also be used to modulate the illumination signal generated by the light source. Specifically, each of the spatial patterns 132$a$, 132$b$, 132$c$ are the same but they are temporally apart from each other and for each of the spatial patterns 132$a$, 132$b$, 132$c$, the light source is modulated at different frequencies k ($k \in K$, K−1, . . . , 1). Moreover, when the light source is modulated by the spatial pattern 134, the light source is also frequency modulated at the higher of the k frequencies such as K. In one implementation of the ToF system 100, K=3. Alternatively, K may be any number greater than or equal to three.

The light source 110 may include a large number of light source pixels. The illustrated implementation shows one such light source pixel 110a generating a light signal that is projected on a surface 152 of an object 150. The light signal generated by the light source pixel 110a may include a direct light component 112 and a global light component 112a. Specifically, the direct light component 112 is directly incident on a point 154 on the surface 152 whereas the global light component 112a is incident on the point 154 indirectly as a result of an interreflection. The scattering of each of the direct light component 112 and the global light component 112a at the point 154 results in a total light signal 114 that is captured by a camera 120 of the ToF module 102.

An implementation of the camera 120 includes a plurality of camera pixels including a camera pixel 120a, wherein each camera pixel is assumed to be able to observe at most one significant scattering event from the surface 152. As a result, is assumed that two different light source pixels cannot produce a direct light component along a given camera pixels line of sight. FIG. 1 illustrates one such camera pixel including its imaging lens 116, a light sampling array 124, and a sampler 124. For example, the sampling array 122 may be a charge coupled device (CCD) array that converts light energy into electrical charge in analog form. The sampler 124 may include an analog-digital converter (ADC) that converts the electrical charge into a digital signal. The combination of the imaging lens 116, the light sampling array 124, and the sampler 124 receives and converts the total light signal 114 into a sampled signal 126 that is communicated to a multipath mitigation module 128. The multipath mitigation module 128 includes an image analyzer 130 that analyzes images captured by the camera 120 to determine various parameters of a direct component and a global component of the total light signal 114.

In one implementation, the light source 110 and the camera 120 may have same number of pixels represented by a matrix with a resolution of m×n such that m is number of rows and n is the number of columns. Each pixel of the camera 120 may be represented by (i,j), with i=1, 2, ..., m and j=1, 2, ... n. In such an implementation, the light L collected by each pixel of a continuous wave time-of-flight (CW ToF) camera can be represented by L(i,j) Specifically, as the total light 114 is a combination of the scattering of the direct light component 112 and a global light component 112a, L(i,j) is a linear combination of a direction component of light $L_d(i,j)$ and a global component of light $L_g(i,j)$, as disclosed below in equation 1.

$$L_{i,j} = L_d(i,j) + L_g(i,j) \quad (1)$$

Here the direct component of light $L_d(i,j)$ can be defined as the light for which the origin is the source pixel 110a and it is backreflected directly by the point 154 of the surface 152. The global component of the light $L_g(i,j)$ includes feasible contribution of various global components, including the back-reflected light collected by the camera pixel (i,j) other than the light for which the origin is the source pixel 110a and it is backreflected directly by the point 154 of the surface 152. Thus the global component of the light $L_g(i,j)$ includes global light component 112a reflected at point 154 or light coming from other light sources such as light 112b from a source pixel 110b backreflected directly by the another point 154b, and other illumination sources or the contribution of the ambient light.

The signal L(i,j) received by the camera pixel 120a is a complex number that can be written in phasor notation as the multiplication of the amplitude A and the complex exponential of the associated angle φ. Specifically, as the signal L(i,j) is a linear combination of the direct and global component of the light, Denominating the direct component of the light with the subscript d and the global component with the subscript g, the signal L(i,j) at the camera pixel 120a may be disclosed as per the equation 2 below:

$$L(i,j) = A(i,j)e^{i\phi(i,j)} = A_d(i,j)e^{i\phi_d(i,j)} + A_g(i,j)e^{i\phi_g(i,j)} \quad (2)$$

When the amplitude and phase of the global light component 112a are non-zero, the time of flight distance calculated for the total light signal 114 as well the magnitude of the total light signal 114 are modified compared to when the amplitude and phase of the global light component 112a are zero.

The solution disclosed in FIG. 1 collects images with two different spatial patterns. Specifically, in the ToF system 100, the processor 106 temporally modulates the source light generated by the light source 110 using the spatial patterns 132 and 134. In one implementation, the processor 106 temporally modulates the source light generated by the light source 110 using the spatial patterns such that k source light images are modulated using one of the spatial patterns 132 and frequency modulated at each of k frequencies and a subsequent image is modulated with spatial pattern 134 and at one of the k frequencies. In one implementation, the subsequent image is modulated with spatial pattern 134 preferably at the highest of the k frequencies. For example, in one such implementation, at time interval $t_{0, \ldots, k-1}$, the light source 110 is modulated using spatial pattern 132 and at time source $t_k$, the light source 110 is modulated by the spatial pattern 134.

The modulated source light illuminates the object 150. The camera 120 acquires the total light 114 scattered by the object 150 in response to the illumination by the modulated source light. Specifically, the camera 120 acquires k+1 images (k images with spatial pattern 132 and k frequencies and k+1th image with spatial pattern 134 and modulation frequency K) of the object 150 at the camera 120 to separate the direction component of light $P_d(i,j)$ and the global component of light $P_g(i,j)$. If the signal collected when a uniform pattern 132 illuminates the light source can be represented by U(i,j) and the signal collected when the spatial pattern 134 illuminates the light source can be represented by U(i,j), U(i,j) and P(i,j) can be represented by P(i,j) as provided below in equation 3.

$$U = A_d e^{i\phi_d} + A_g e^{i\phi_g}$$

$$P = \gamma \cdot A_d e^{i\phi_d} + C \cdot A_g e^{i\phi_g} \quad (3)$$

Note that each of the U and P represent matrices. Thus, U represents a matrix U(i,j), with (i,j), with i=1, 2, ..., m and j=1, 2, ... n. As seen from equation 3, each of the U and P has a direct component and a global component. The amplitudes of the direct component and the global components for each of the U and P are represented by, respectively, $A_d$, and $A_g$. While the phases of the direct component and the global components for each of the U and P are represented by, respectively, $\phi_d$, and $\phi_g \cdot \gamma$ is the spatial pattern contrast regarding the uniform illumination, and C the global contrast, i.e., the light loss induced by using a pattern.

Rewriting equations 3 in real and complex parts using Euler notation, represented by underscripts r and c being real and complex part of the signal, and D being the direct component of the signal and G being the global component of the signal, equations 3 may be rewritten as follows, not including (i,j) for clarity:

$$U_r = D_r + G_r$$

$$U = D_c + G_c$$

$$P_r = \gamma \cdot D_r + C \cdot G_r$$

$$P_c = \gamma \cdot D_c + C \cdot G_c \qquad (4)$$

In equation 7 above, the subscripts r and c denote the real and the complex parts of the phasors. D is the direct component of the total light 114 captured by a pixel of the camera 120 and G is the global component of the total light 114 captured by a pixel of the camera 120. Solving these equations, the values of the variables $\{D_r, D_c, G_r, G_c\}$ may be provided by equation 8 below:

$$D_r = \frac{-P_r + CU_r}{C - \gamma} \qquad (5)$$

$$D_c = \frac{-P_c + CU_c}{C - \gamma}$$

$$G_r = \frac{-P_r + \gamma U_r}{C - \gamma}$$

$$G_c = \frac{-P_c + \gamma U_c}{C - \gamma}$$

The amplitudes of the direct component and the global $\{A_d, A_g\}$ and the phases of the direct and global components $\{\phi_d, \phi_g\}$ can calculated as per Equation 6 below:

$$A_d = \frac{\sqrt{(-P_r + CU_r)^2 + (-P_c + CU_c)^2}}{C - \gamma} \qquad (6)$$

$$A_g = \frac{\sqrt{(-P_r + \gamma U_r)^2 + (-P_c + \gamma U_c)^2}}{C - \gamma}$$

$$\phi_d = \operatorname{atan}\left(\frac{-P_c + CU_c}{-P_r + CU_r}\right)$$

$$\phi_g = \operatorname{atan}\left(\frac{-P_c + \gamma U_c}{-P_r + \gamma U_r}\right)$$

Here average contrast C and immediate contrast γ are considered as constant for materials with diffuse backscattering and they can be evaluated from a previous calibration pattern or calculated from an estimation of the immediate contrast γ The immediate contrast γ may be obtained from calibration of the patterns 132 or 134. C can be calculated as the mean or median of all the values of the scene provided by the immediate contrast. Where $A_d > A_g$, the γ may be calculated as $$\gamma = \frac{|P|}{|U|}$$

The above solution allows to mitigate the multipath, however, as it can be seen from equation 6, when γ→C, this solution results in a residue that produces a structure that depends on the pattern 134—for example, when the spatial pattern 134 has vertical bars, the residue is a vertical structure. To reduce the vertical residue, the multipath mitigation module 128 includes a denoising module 140 that performs a denoising operation as further disclosed below in FIG. 2 below.

Figure 2:
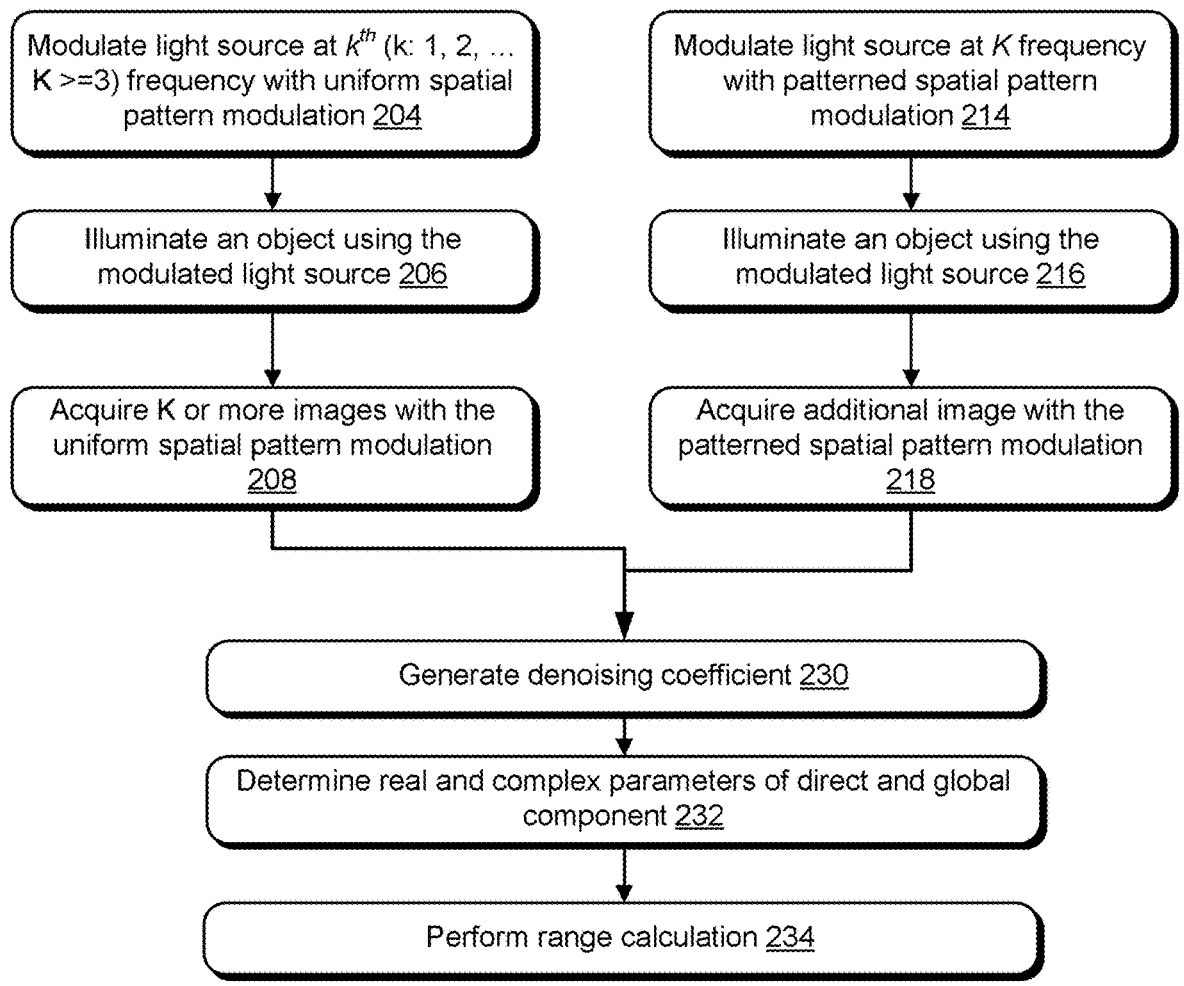
FIG. 2 illustrates example operations for multipath mitigation according to the implementation disclosed in FIG. 1.

FIG. 2 illustrates example operations for multipath mitigation according to the implementation disclosed in FIG. 1. Specifically, FIG. 2 illustrates example operations 200 for separating the direct component of the light from the global component that contains the multipath. One or more operations 200 may be performed by the image analyzer 130 disclosed in FIG. 1. Specifically, an operation 204 modulates a light source (such as the light source 110 of FIG. 1) using a uniform spatial pattern (such as the uniform spatial patterns 132 of FIG. 1) from a pattern data store. In the illustrated implementation, the operation 204 modulates the light source with the uniform spatial pattern and temporally modulates the light signal with k different frequencies. For example, k may be greater than or equal to three. An operation 206 illuminates an object (such as the object 150 of FIG. 1) using the modulated light source. The modulated light is scattered from the object towards a camera (such as the camera 150 of FIG. 1). An operation 208 acquires k images where the object is illuminated with the light source being modulated with the uniform spatial pattern and k frequencies.

Similarly, an operation 214 acquires an additional k+1$^{th}$ image where the object is illuminated with the light source being modulated with the non-uniform spatial pattern and frequency modulated with one of the k frequencies. In one implementation, operation 214 acquires an additional k+1$^{th}$ image where the object is illuminated with the light source being modulated with the non-uniform spatial pattern and frequency modulated with the highest of the k frequencies. An operation 216 illuminates the object with the modulated light signal and an operation 218 acquires an additional, k+1$^{th}$, image when the light source is modulated with a spatial pattern and frequency modulated with one of the k frequencies. In one implementation, operation 216 illuminates the object with the modulated light signal and an operation 218 acquires an additional, k+1$^{th}$, image when the light source is modulated with a spatial pattern and frequency modulated with the highest of the k frequencies. Each of the k+1 images may be in the form of a matrix with each observation of the matrix corresponding to individual pixels of the camera.

An operation 230 generate an example of denoising coefficient (m,n) to increase the signal to noise ratio (SNR). In one implementation, the denoising operation generates the denoising or weighing coefficient (m,n) using the equation below:

$$\xi(m,n) = \frac{[C - \gamma(m,n)]\exp\left[-\left(\frac{m - \overline{m}}{\sigma_m}\right)^2\right]\exp\left[-\left(\frac{n - \overline{n}}{\sigma_n}\right)^2\right]}{\sum_{m=-M}^{M}\sum_{n=-N}^{N}[C - \gamma(m,n)]\exp\left[-\left(\frac{m - \overline{m}}{\sigma_m}\right)^2\right]\exp\left[-\left(\frac{n - \overline{n}}{\sigma_n}\right)^2\right]}$$

Here m (−M, . . . , M) and n (−N, . . . , N) denotes a size of a kernel matrix applied to each pixel locations in each of the k+1 images acquired at operations 208 and 218. Note that m and n do not have to be equal, therefore, the kernel may be rectangular, which allows using patterns with predominant direction. Depending on the size of the kernel and the values of the standard deviations, the denoising coefficient ξ(m,n) can produce a reduction in the spatial frequencies of the image. An example kernel may be a kernel to apply immediate contrast. A property o such an immediate contrast kernel is that if the kernel is large, the average contrast C is calculated as the global change of optical power between the uniform and the pattern image as provided below:

$$\sum_{m=-M}^{M}\sum_{n=-N}^{N}\gamma(m,n)\to C$$

Subsequently an operation 232 determines the real and complex parameters of the direct and global components of a signal received at the camera using the following equation:

$$\text{Direct}\begin{cases}\overline{D}_r(i,j,K)=\sum_{m=-M}^{M}\sum_{n=-N}^{N}\xi(m,n)\dfrac{-P_r(m,n,K)+C\cdot U_r(m,n,K)}{C-\gamma(m,n)}\\[2pt]\overline{D}_c(i,j,K)=\sum_{m=-M}^{M}\sum_{n=-N}^{N}\xi(m,n)\dfrac{-P_c(m,n,K)+C\cdot U_c(m,n,K)}{C-\gamma(m,n)}\end{cases}$$

$$\text{Global}\begin{cases}\overline{G}_r(i,j,K)=\sum_{m=-M}^{M}\sum_{n=-N}^{N}\xi(m,n)\dfrac{-P_r(m,n,K)+\gamma(m,n)\cdot U_r(m,n,K)}{C-\gamma(m,n)}\\[2pt]\overline{G}_c(i,j,K)=\sum_{m=-M}^{M}\sum_{n=-N}^{N}\xi(m,n)\dfrac{-P_c(m,n,K)+\gamma(m,n)\cdot U_c(m,n,K)}{C-\gamma(m,n)}\end{cases}$$

An operation 234 performs range calculation.

Figure 3:
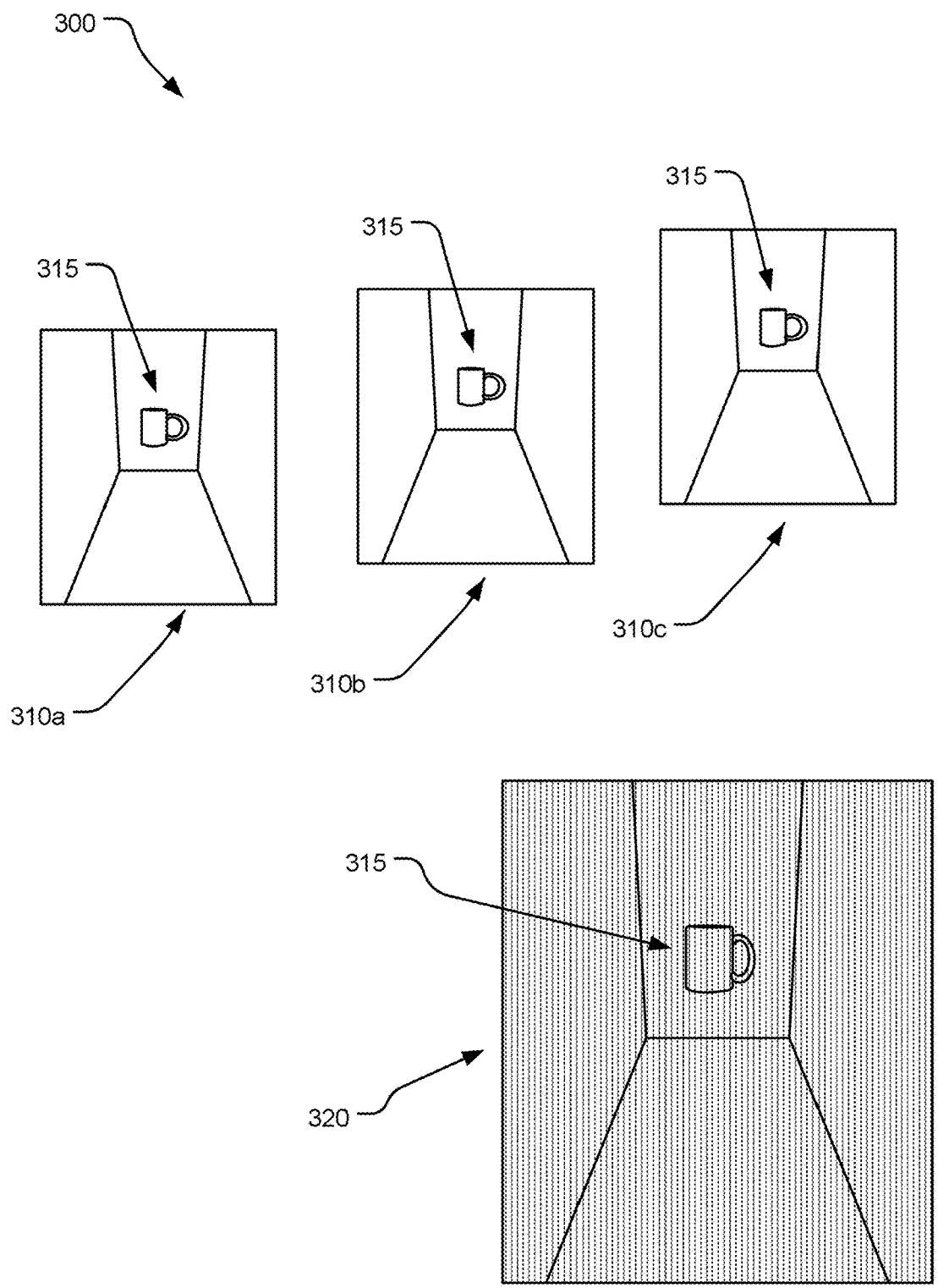
FIG. 3 illustrates an example schematics of the implementation of the time-of-flight multipath mitigation technology disclosed in FIG. 1.

FIG. 3 illustrates an example schematics 300 of the implementation of the time-of-flight multipath mitigation technology disclosed in FIG. 1. Specifically, FIG. 3 illustrates three uniform patterns 310a, 310b, 310c that may be used to modulate a light source applied to an object 315. Specifically, each of the uniform patterns 310a, 310b, 310c are same, however, temporally the light source is modulated at different frequency when applying these uniform patterns. Thus, for example, the modulation frequency of the light source when uniform pattern 310a is applied maybe $f_K$, the modulation frequency of the light source when uniform pattern 310b is applied maybe $f_{K-1}$, and the modulation frequency of the light source when uniform pattern 310c is applied maybe $f_{K-2}$. Subsequently, a non-uniform spatial pattern 320 is applied to the light source with modulation frequency $f_K$.

Figure 4:
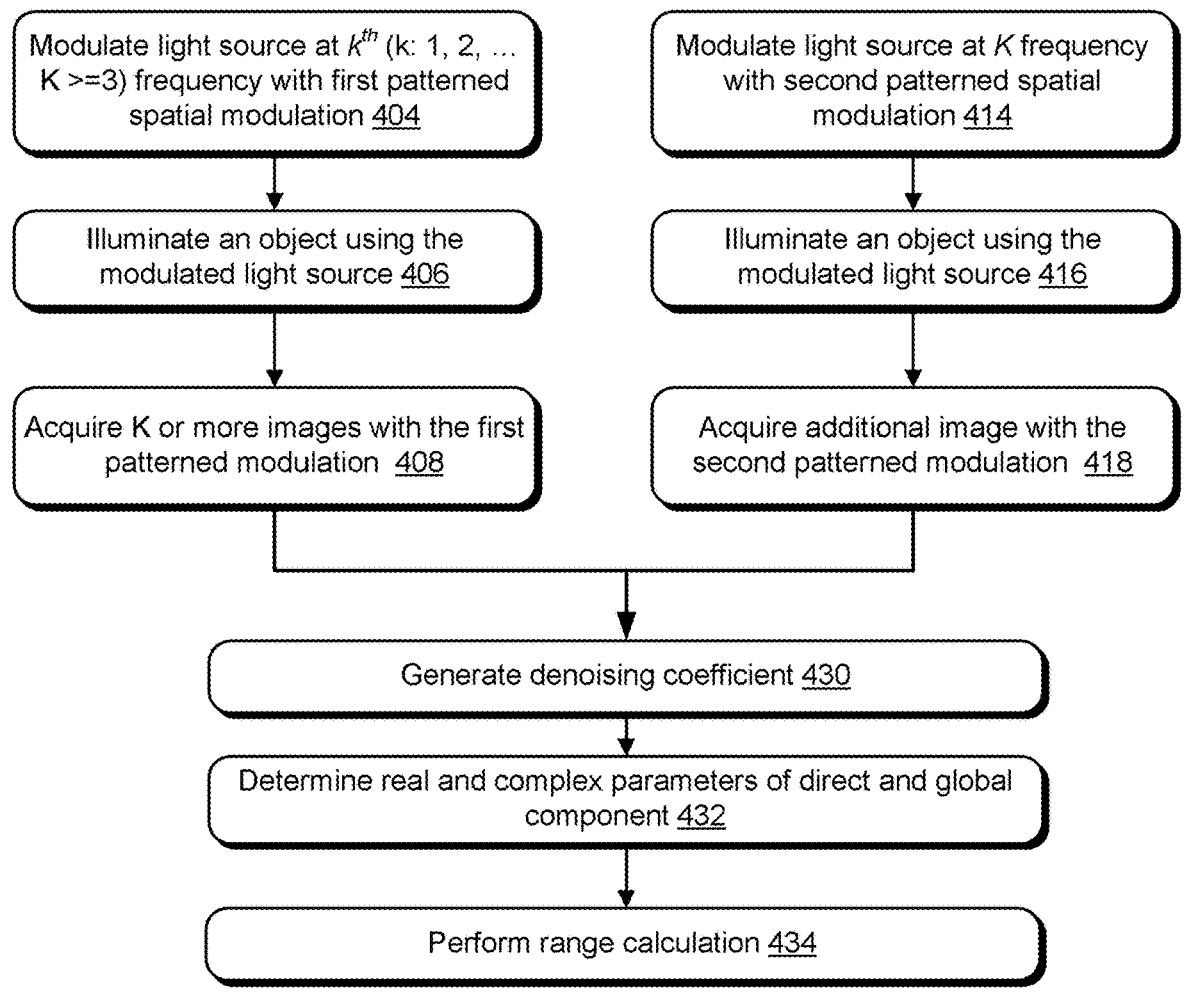
FIG. 4 illustrates alternative example operations for multipath mitigation according to the implementation disclosed in FIG. 1.

FIG. 4 illustrates alternative example operations 400 for multipath mitigation according to the implementation disclosed in FIG. 1. One or more of the operations 400 may be substantially similar to the operations 200 disclosed in FIG. 2. However, the operations 400 differ from the operations 200 in that while operation 204 modulates the light source with uniform patterned spatial modulation, operation 404 modulates the light source with first patterned spatial modulation. Specifically, the first spatial pattern used by operation 404 is different from the second spatial patter used by an operation 414.

Figure 5:
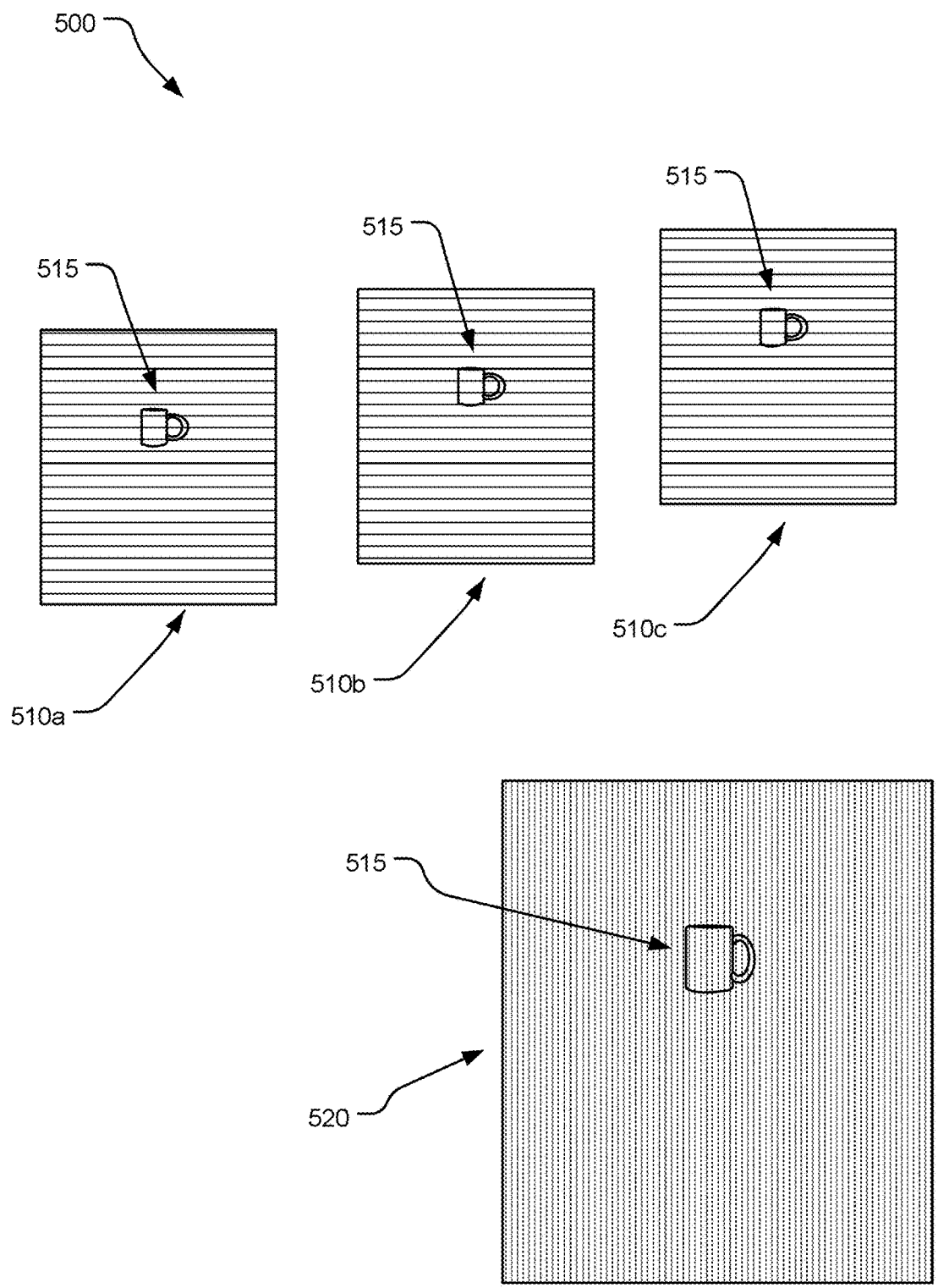
FIG. 5 illustrates alternative example schematics of the implementation of the time-of-flight multipath mitigation technology disclosed in FIG. 1.

FIG. 5 illustrates alternative example schematics 500 of the implementation of the time-of-flight multipath mitigation technology disclosed in FIG. 1. Specifically, FIG. 5 illustrates three horizontal patterns 510a, 510b, 510c that may be used to modulate a light source applied to an object 515. Specifically, each of the uniform patterns 510a, 510b, 510c are same, however, temporally the light source is modulated at different frequency when applying these uniform patterns. Thus, for example, the modulation frequency of the light source when uniform pattern 510a is applied maybe $f_K$, the modulation frequency of the light source when uniform pattern 510b is applied maybe $f_{K-1}$, and the modulation frequency of the light source when uniform pattern 510c is applied maybe $f_{K-2}$. Subsequently, another non-uniform spatial pattern 320, specifically a vertical spatial pattern, is applied to the light source with modulation frequency $f_K$.

Figure 6:
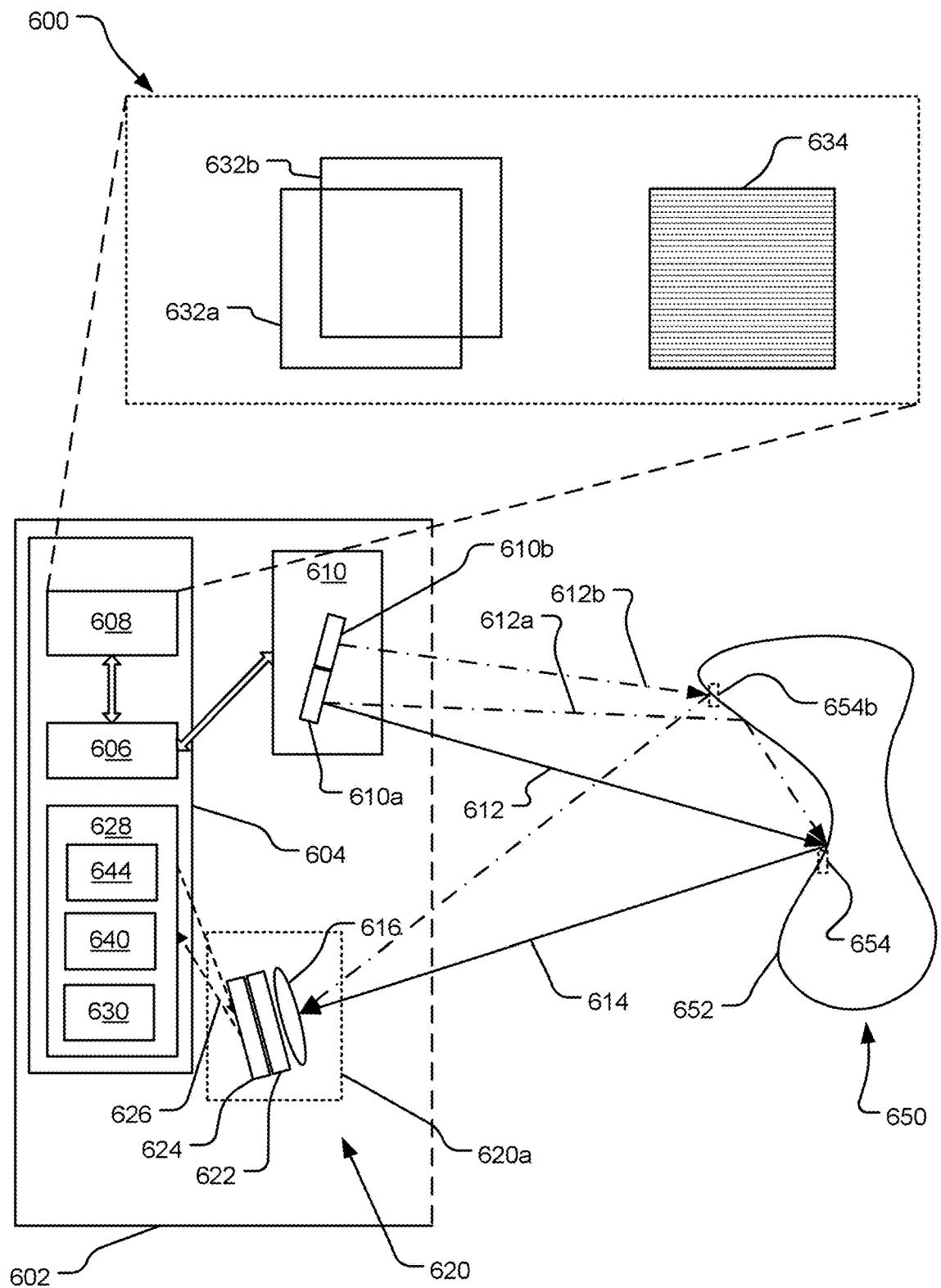
FIG. 6 illustrates an alternative example implementation of the time-of-flight multipath mitigation technology disclosed herein.

FIG. 6 illustrates an alternative example implementation 600 of the time-of-flight multipath mitigation technology disclosed herein. One or more of the elements disclosed in FIG. 6 are substantially similar to those recited in FIG. 1. However, the multipath mitigation module 628 has one or more functions different than the multipath mitigation module 128 disclosed in FIG. 1, the denoising module 640 performs one or more functions compared to the denoising module 140 disclosed in FIG. 1, and the spatial pattern data store 608 may store one or more spatial patterns different than the spatial pattern data store 108 disclosed in FIG. 1. These elements are further disclosed below with respect to FIG. 6.

A ToF module 602 may include a computing module 604 that includes a processor 606 and a spatial pattern data store 608. The spatial pattern data store 608 may store one or more spatial patterns, such as spatial patterns 632, 634 that may be used to spatially modulate illumination signal from a light source 610. The light source 610 may be a two-dimensional grid of light source elements, referred to as light source pixels. For example, the light source 610 may be an array of m×n light source elements, each light source element being a laser diode.

In one implementation, the processor 606 may communicate with the light source 610 to cause the illumination signal generated by the light source to be modulated by the spatial patterns 632a, 632b (collectively "spatial patterns 632"), and 634. For example, the spatial patterns 632 may be uniform patterns and the spatial pattern 634 is a pattern of horizontal lines. The spatial patterns 632 and 634 are two dimensional patterns that map to the two-dimensional grid of light source elements 610a, 610b. Additionally, other patterns such as a dot-pattern may also be used to modulate the illumination signal generated by the light source. Specifically, all of the spatial patterns 632a, 632b are the same but they are temporally apart from each other and for each of the spatial patterns 632a and 632b the light source is modulated at different frequencies k (k∈K, K−1, . . . , 1). Moreover, when the light source is modulated by the spatial pattern 134, the light source is also frequency modulated at the higher of the k frequencies such as K. In one implementation of the ToF system 600, K=2. Alternatively, K may be any number greater than or equal to two.

The light source 610 may include a large number of light source pixels. The illustrated implementation shows one such light source pixel 610a generating a light signal that is projected on a surface 652 of an object 650. The light signal generated by the light source pixel 610a may include a direct light component 612 and a global light component 612a. Specifically, the direct light component 612 is directly incident on a point 654 on the surface 652 whereas the global light component 612a is incident on the point 654 indirectly as a result of an interreflection. The scattering of each of the direct light component 612 and the global light component 612a at the point 654 results in a total light signal 614 that is captured by a camera 620 of the ToF module 602.

An implementation of the camera 620 includes a plurality of camera pixels including a camera pixel 620a, wherein each camera pixel is assumed to be able to observe at most one significant scattering event from the surface 652. As a result, is assumed that two different light source pixels cannot produce a direct light component along a given camera pixels line of sight. FIG. 6 illustrates one such camera pixel including its imaging lens 616, a light sampling array 624, and a sampler 624. For example, the sampling array 622 may be a charge coupled device (CCD) array that converts light energy into electrical charge in analog form. The sampler 624 may include an analog-digital converter (ADC) that converts the electrical charge into a digital signal. The combination of the imaging lens 616, the light sampling array 624, and the sampler 624 receives and converts the total light signal 614 into a sampled signal 626 that is communicated to a multipath mitigation module 628. The multipath mitigation module 628 includes an image analyzer 630 that analyzes images captured by the camera 620 to determine various parameters of a direct component and a global component of the total light signal 614.

The modulated source light illuminates the object 650. The camera 620 acquires the total light 614 scattered by the object 650 in response to the illumination by the modulated source light. Specifically, the camera 620 acquires k+1 images (k images with spatial pattern 632 and k frequencies and k+1$^{th}$ image with spatial pattern 634 and modulation frequency K) of the object 650 at the camera 620 to separate the direction component of light $P_d(i,j)$ and the global component of light $P_g(i,j)$.

The light source 610 may include a large number of light source pixels. The illustrated implementation shows one such light source pixel 610a generating a light signal that is projected on a surface 652 of an object 650. The light signal generated by the light source pixel 610a may include a direct light component 612 and a global light component 612a. Specifically, the direct light component 612 is directly incident on a point 654 on the surface 652 whereas the global light component 612a is incident on the point 654 indirectly as a result of an interreflection. The scattering of each of the direct light component 612 and the global light component 612a at the point 654 results in a total light signal 614 that is captured by a camera 620 of the ToF module 602.

In the present implementation, the multipath mitigation module 628 includes a denoising module 640 and a frequency conversion module 644. The denoising module 640 generates a denoising coefficient (m,n) to increase the signal to noise ratio (SNR). An example of the denoising module 640 generates the denoising coefficient (m,n) using the equation below:

$$\xi(m,n) = \frac{[C - \gamma(m,n)]\exp\left[-\left(\frac{m-\bar{m}}{\sigma_m}\right)^2\right]\exp\left[-\left(\frac{n-\bar{n}}{\sigma_n}\right)^2\right]}{\sum_{m=-M}^{M}\sum_{n=-N}^{N}[C - \gamma(m,n)]\exp\left[-\left(\frac{m-\bar{m}}{\sigma_m}\right)^2\right]\exp\left[-\left(\frac{n-\bar{n}}{\sigma_n}\right)^2\right]}$$

Here m (−M, . . . , M) and n (−N, . . . , N) denotes a size of a kernel matrix applied to each pixel locations in each of the k+1 images acquired at operations 708 and 718 disclosed below in FIG. 7. Note that m and n do not have to be equal, therefore, the kernel may be rectangular, which allows using patterns with predominant direction. Depending on the size of the kernel and the values of the standard deviations, the denoising coefficient (m,n) can produce a reduction in the spatial frequencies of the image captured by a camera 620 of the ToF module 602.

In an example implementation, the frequency conversion module 644 is based on constant Time of Flight for the total of frequencies. Specifically, time t(i,j) can be converted into total phase ϕ(i,j,k) of a specific frequency f(k) using the following equation $$\phi(i,j,k) = 4\pi t(i,j)f(k)$$

This total phase is related to the measured phase through the following equation:

$$\phi(i,j,k) = \tilde{\phi}(i,j,k) + 2\pi PO(i,j,k)$$

The module 644 performs conversion of frequencies keeping the active brightness of the frequencies to be converted f(k→K) with k< >K and transforming the phase into the frequency K using the following equations:

$$\phi(i, j, k \to K) = \left[\frac{\tilde{\phi}_k(i, j, k) + 2\pi PO(i, j, k)}{f(k)}\right]f(K)$$

Where $\tilde{\phi}(i,j,k \to K)$ is the total converted phase from frequency f(k) into f(K), $\tilde{\phi}_k(i,j,k)$ is the measured phase for the specific frequency, and $PO(i,j,k) \in \mathbb{N} \equiv \{0, 1, 2, \ldots\}$ is the number of phase orders (wraps) required for producing a constant Timeof Flight for the total number of frequencies. Assuming that the casted frequencies correspond to the uniform acquisitions, the converted signal can be described as below:

$$\tilde{U}(i,j,k \to K) = \tilde{A}(i,j,k)e^{i\tilde{\phi}(i,j,k \to K)}$$

After this transformation, the multipath mitigation module 628 separates the global and direct components of the light using the following equation.

$$\text{Direct} \begin{cases} \overline{D}_r(i, j, K) = \sum_{m=-M}^{M}\sum_{n=-N}^{N} \xi\{m,n\} \frac{-P_r(m,n,k) + C \cdot U_r(m,n,k \to K)}{C - \gamma(m,n)} \\ \overline{D}_c(i, j, K) = \sum_{m=-M}^{M}\sum_{n=-N}^{N} \xi\{m,n\} \frac{-P_c(m,n,k) + C \cdot U_c(m,n,k \to K)}{C - \gamma(m,n)} \end{cases}$$

$$\text{Global} \begin{cases} \overline{G}_r(i, j, k) = \sum_{m=-M}^{M}\sum_{n=-N}^{N} \xi\{m,n\} \frac{-P_r(m,n,k) + \gamma(m,n) \cdot U_r(m,n,k \to K)}{C - \gamma(m,n)} \\ \overline{G}_c(i, j, k) = \sum_{m=-M}^{M}\sum_{n=-N}^{N} \xi\{m,n\} \frac{-P_c(m,n,k) + \gamma(m,n) \cdot U_c(m,n,k \to K)}{C - \gamma(m,n)} \end{cases}$$

Figure 7:
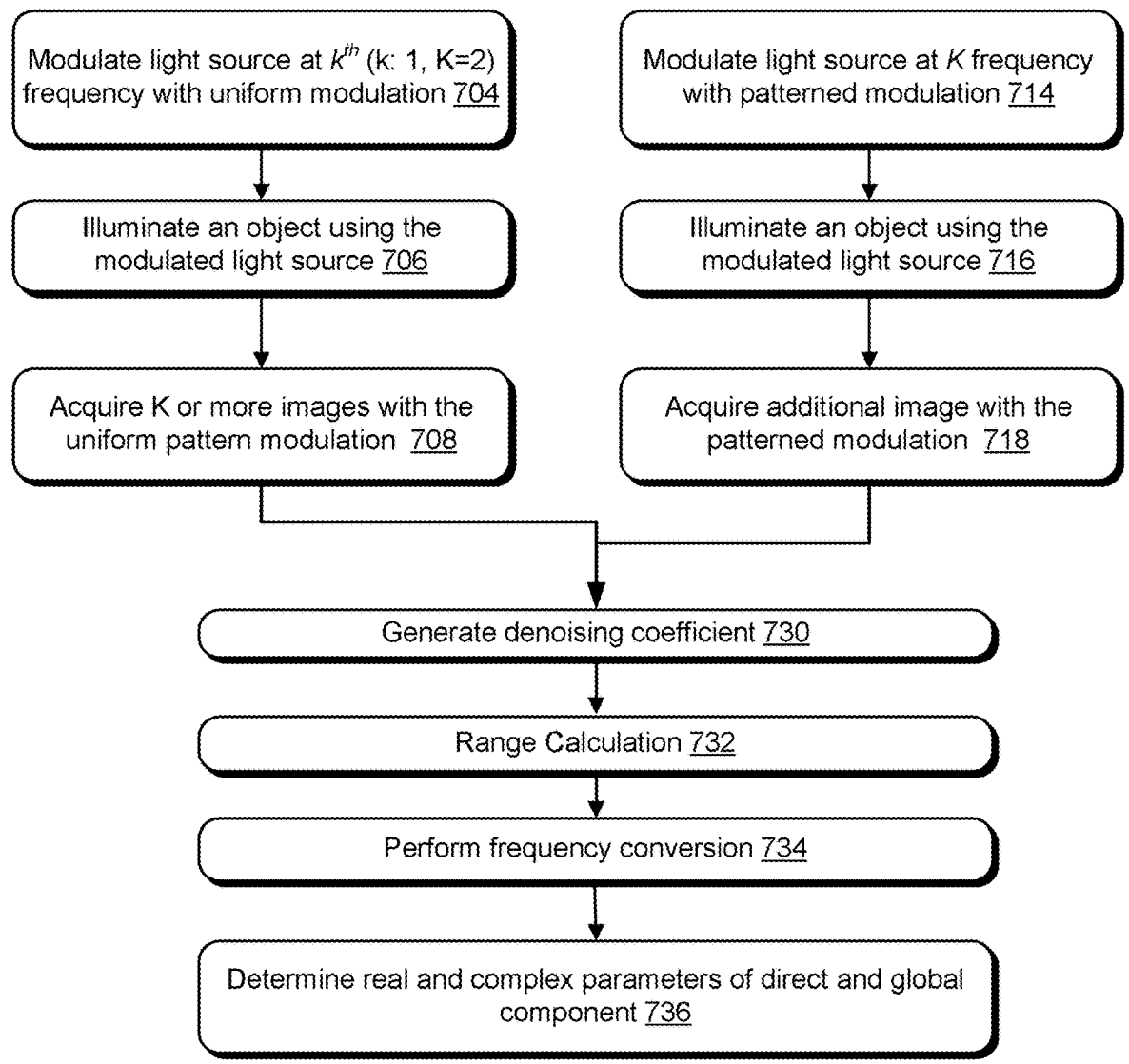
FIG. 7 illustrates example operations for multipath mitigation according to the implementation disclosed in FIG. 6.

FIG. 7 illustrates example operations 700 for multipath mitigation according to the implementation disclosed in FIG. 6. Specifically, FIG. 7 illustrates example operations 700 for separating the direct component of the light from the global component that contains the multipath. One or more operations 700 may be performed by the image analyzer 630 disclosed in FIG. 6. Specifically, an operation 704 modulates a light source (such as the light source 610 of FIG. 6) using a uniform spatial pattern (such as the uniform spatial patterns 632 of FIG. 6) from a pattern data store. In the illustrated implementation, the operation 704 modulates the light source with the uniform spatial pattern and temporally modulates the light signal with k different frequencies. For example, k may be equal to two. An operation 706 illuminates an object (such as the object 650 of FIG. 6) using the modulated light source. The modulated light is scattered from the object towards a camera (such as the camera 620 of FIG. 6). An operation 708 acquires k images where the object is illuminated with the light source being modulated with the uniform spatial pattern and k frequencies.

Similarly, an operation 714 acquires an additional k+1$^{th}$ image where the object is illuminated with the light source being modulated with the non-uniform spatial pattern and frequency modulated with one of the k frequencies. In one implementation, operation 714 acquires an additional k+1$^{th}$ image where the object is illuminated with the light source being modulated with the non-uniform spatial pattern and frequency modulated with, preferably, the highest of the k frequencies. An operation 716 illuminates the object with the modulated light signal and an operation 718 acquires an additional, k+1$^{th}$, image when the light source is modulated with a spatial pattern and frequency modulated with one of the k frequencies. Each of the k+1 images may be in the form of a matrix with each observation of the matrix corresponding to individual pixels of the camera 620.

An operation 730 generates a denoising coefficient (m,n) to increase the signal to noise ratio (SNR) as discussed above with respect to the denoising module 640. An operation 732 performs one or more range calculation operations. Subsequently an operation 734 performs frequency conversion as discussed above with respect to the frequency conversion module 644. Finally, an operation 736 determines the real and the complex parameters of the direct and global components of the light using the calculation discussed above with respect to the multipath mitigation module 628.

Figure 8:
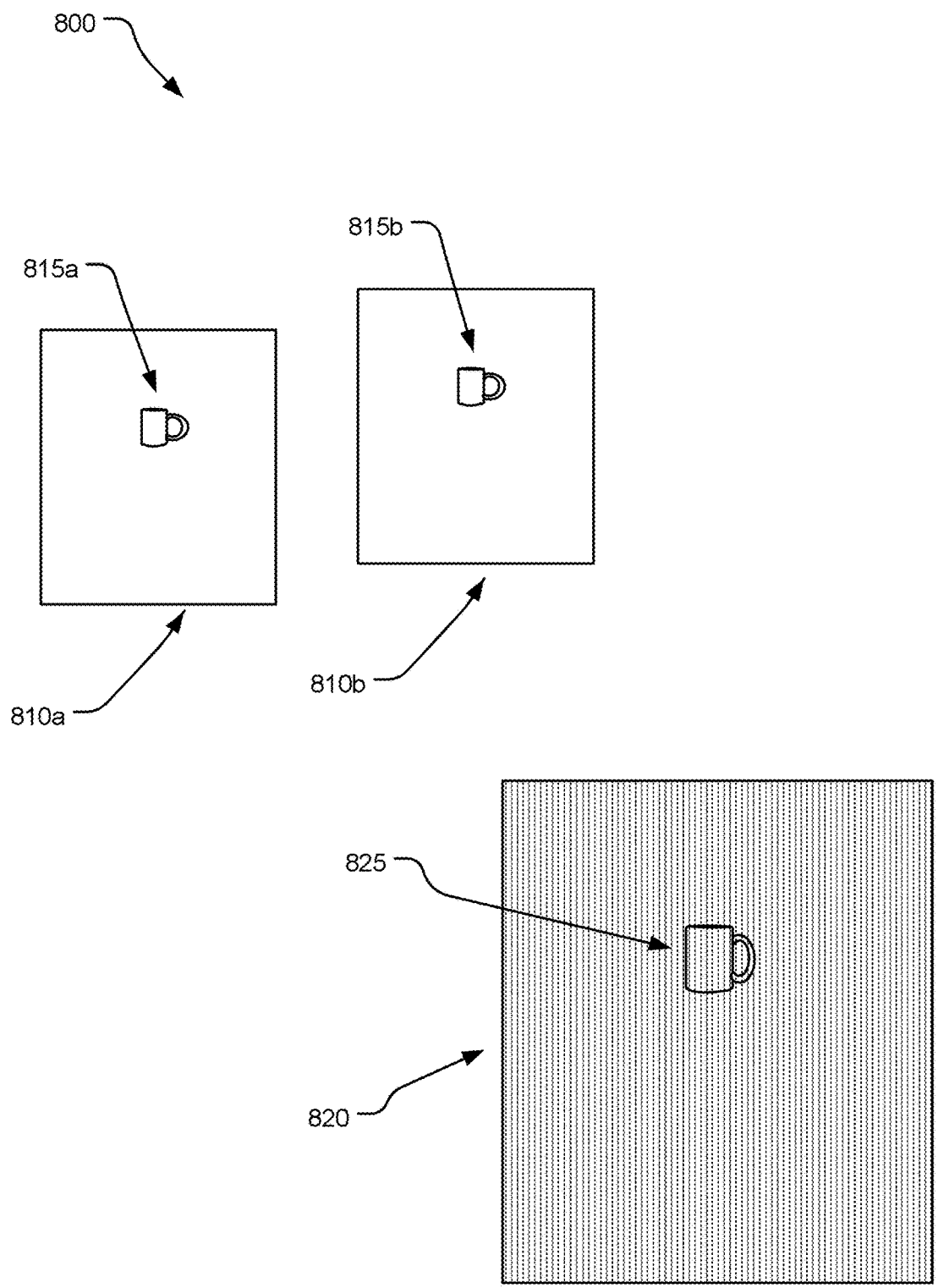
FIG. 8 illustrates an example schematics of the implementation of the time-of-flight multipath mitigation technology disclosed in FIG. 6.

FIG. 8 illustrates an example schematics 800 of the implementation of the time-of-flight multipath mitigation technology disclosed in FIG. 6. Specifically, FIG. 8 illustrates three uniform patterns 810a and 810b that may be used to modulate a light source directed to an object 825. Specifically, each of the uniform patterns 810a and 810b are same, however, temporally the light source is modulated at different frequency when applying these uniform patterns. Thus, for example, the modulation frequency of the light source when uniform pattern 810a is applied maybe $f_K$ and the modulation frequency of the light source when uniform pattern 810b is applied maybe $f_{K-1}$. Subsequently, a non-uniform spatial pattern 820 is applied to the light source directed to an object 825 with modulation frequency $f_K$.

Figure 9:
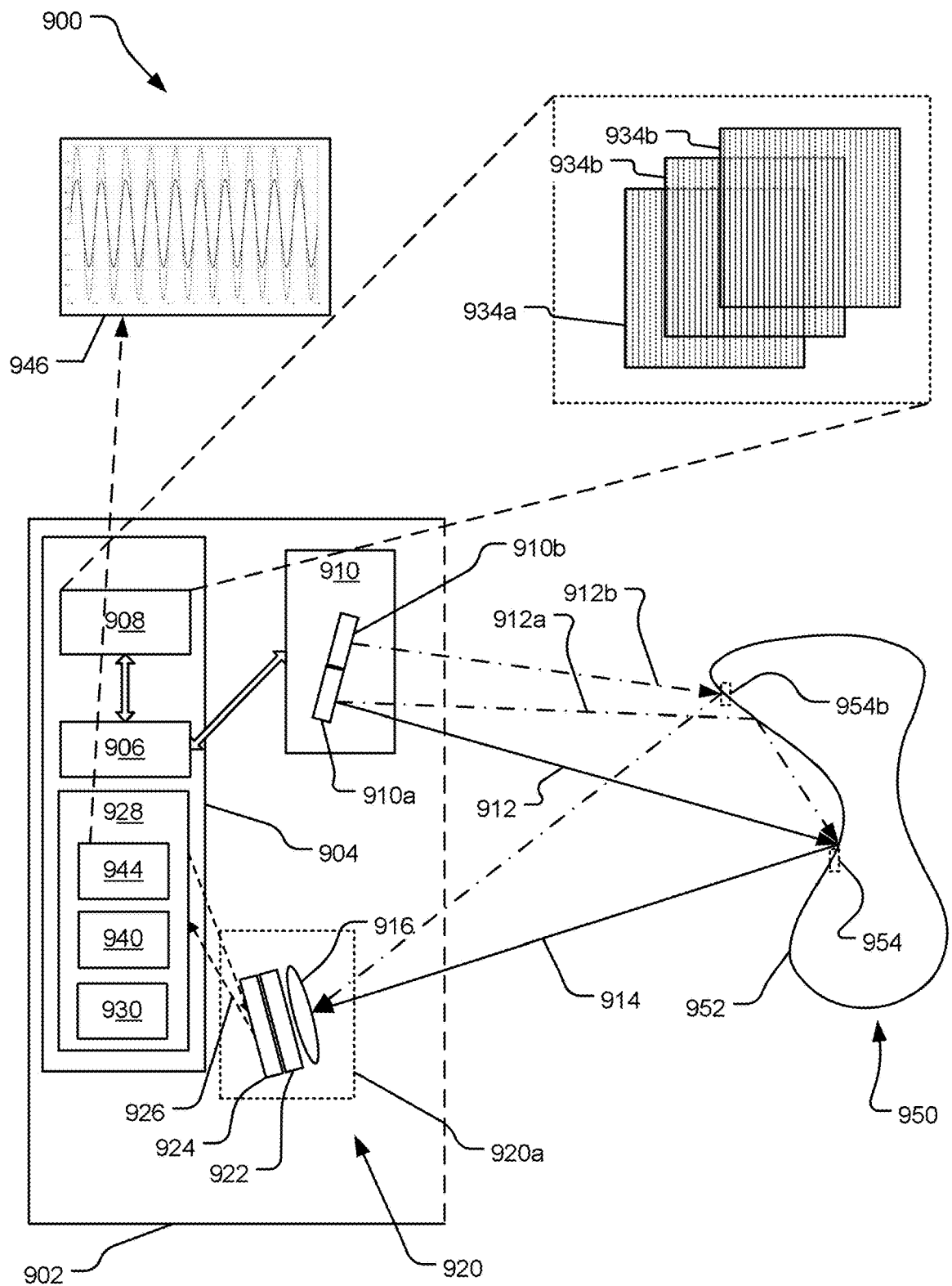
FIG. 9 illustrates an alternative example implementation of the time-of-flight multipath mitigation technology disclosed herein.

FIG. 9 illustrates an alternative example implementation 900 of the ToF multipath mitigation technology disclosed herein. One or more of the elements disclosed in FIG. 9 are substantially similar to those recited in FIG. 1. However, the multipath mitigation module 928 has one or more functions different than the multipath mitigation module 128 disclosed in FIG. 1, the denoising module 940 performs one or more functions compared to the denoising module 140 disclosed in FIG. 1, and the spatial pattern data store 908 may store one or more spatial patterns different than the spatial pattern data store 108 disclosed in FIG. 1. These elements are further disclosed below with respect to FIG. 9.

A ToF module 902 may include a computing module 904 that includes a processor 906 and a spatial pattern data store 908. The spatial pattern data store 908 may store one or more spatial patterns, such as spatial patterns 932, 934 that may be used to spatially modulate illumination signal from a light source 910. The light source 910 may be a two-dimensional grid of light source elements, referred to as light source pixels. For example, the light source 910 may be an array of m×n light source elements, each light source element being a laser diode.

In one implementation, the processor 906 may communicate with the light source 910 to cause the illumination signal generated by the light source to be modulated by the spatial patterns 934a, 934b, 934c (collectively "spatial patterns 934"). For example, the spatial patterns 934 may be a pattern of horizontal lines. The spatial patterns 934 are two dimensional patterns that map to the two-dimensional grid of light source elements 910a, 910b. Additionally, other patterns such as a dot-pattern may also be used to modulate the illumination signal generated by the light source. Specifically, all of the spatial patterns 934 are the same but they are temporally apart from each other and for each of the spatial patterns 934 the light source is modulated at different frequencies k (k∈K, K−1, . . . , 1). In one implementation of the ToF system 900, K=3. Alternatively, K may be any number greater than or equal to three.

The light source 910 may include a large number of light source pixels. The illustrated implementation shows one such light source pixel 910a generating a light signal that is projected on a surface 952 of an object 950. The light signal generated by the light source pixel 910a may include a direct light component 912 and a global light component 912a. Specifically, the direct light component 912 is directly incident on a point 954 on the surface 952 whereas the global light component 912a is incident on the point 954 indirectly as a result of an interreflection. The scattering of each of the direct light component 912 and the global light component 912a at the point 6954 results in a total light signal 914 that is captured by a camera 920 of the ToF module 902.

An implementation of the camera 920 includes a plurality of camera pixels including a camera pixel 920a, wherein each camera pixel is assumed to be able to observe at most one significant scattering event from the surface 952. As a result, is assumed that two different light source pixels cannot produce a direct light component along a given camera pixels line of sight. FIG. 9 illustrates one such camera pixel including its imaging lens 916, a light sampling array 924, and a sampler 924. For example, the sampling array 922 may be a charge coupled device (CCD) array that converts light energy into electrical charge in analog form. The sampler 924 may include an analog-digital converter (ADC) that converts the electrical charge into a digital signal. The combination of the imaging lens 916, the light sampling array 924, and the sampler 924 receives and converts the total light signal 914 into a sampled signal 926 that is communicated to a multipath mitigation module 928. The multipath mitigation module 928 includes an image analyzer 930 that analyzes images captured by the camera 920 to determine various parameters of a direct component and a global component of the total light signal 914.

The modulated source light illuminates the object 950. The camera 920 acquires the total light 914 scattered by the object 950 in response to the illumination by the modulated source light. Specifically, the camera 920 acquires k+1 images with spatial pattern 934 and modulation frequency K) of the object 650 at the camera 620 to separate the direction component of light $P_d(i,j)$ and the global component of light $P_g(i,j)$.

The light source 910 may include a large number of light source pixels. The illustrated implementation shows one such light source pixel 910a generating a light signal that is projected on a surface 952 of an object 950. The light signal generated by the light source pixel 610a may include a direct light component 912 and a global light component 912a. Specifically, the direct light component 912 is directly incident on a point 954 on the surface 952 whereas the global light component 612a is incident on the point 954 indirectly as a result of an interreflection. The scattering of each of the direct light component 912 and the global light component 912a at the point 954 results in a total light signal 914 that is captured by a camera 920 of the ToF module 902.

In the present implementation, the multipath mitigation module 928 includes a denoising module 940 and a law-pass filter 944. The denoising module 940 generates a denoising coefficient ξ(m,n) to increase the signal to noise ratio (SNR). An example, of the denoising module 940 generates the denoising coefficient ξ(m,n) using the equation below:

$$\xi(m,n) = \frac{[C - \gamma(m,n)]\exp\left[-\left(\frac{m-\bar{m}}{\sigma_m}\right)^2\right]\exp\left[-\left(\frac{n-\bar{n}}{\sigma_n}\right)^2\right]}{\sum_{m=-M}^{M}\sum_{n=-N}^{N}[C - \gamma(m,n)]\exp\left[-\left(\frac{m-\bar{m}}{\sigma_m}\right)^2\right]\exp\left[-\left(\frac{n-\bar{n}}{\sigma_n}\right)^2\right]}$$

Here m (−M, ..., M) and n (−N, ..., N) denotes a size of a kernel matrix applied to each pixel locations in each of the k+1 images acquired at operation 1008 disclosed below in FIG. 10. Note that m and n do not have to be equal, therefore, the kernel may be rectangular, which allows using patterns with predominant direction. Depending on the size of the kernel and the values of the standard deviations, the denoising coefficient (m,n) can produce a reduction in the spatial frequencies of the image captured by a camera 920 of the ToF module 902. One assumption behind the implementation disclosed in FIG. 9 is that the direct component of the light has higher frequencies than the global component because the multipath tends to wash out the high frequencies for the global component. Therefore, the implementation 900 provides the low-pass filter (LPF) 944 that is applied to the image generated by the camera 920. The LPF 944 may be a gaussian filter, a weighted filter, a standard mean filter, a Gabor wavelengths filter, etc.

The effect of the application of the LPF 944 is illustrated by the graph 946, where the signal output from the denoising module 940 is represented by the green signal whereas he signal after application of the LPF 944 is illustrated by black.

Figure 10:
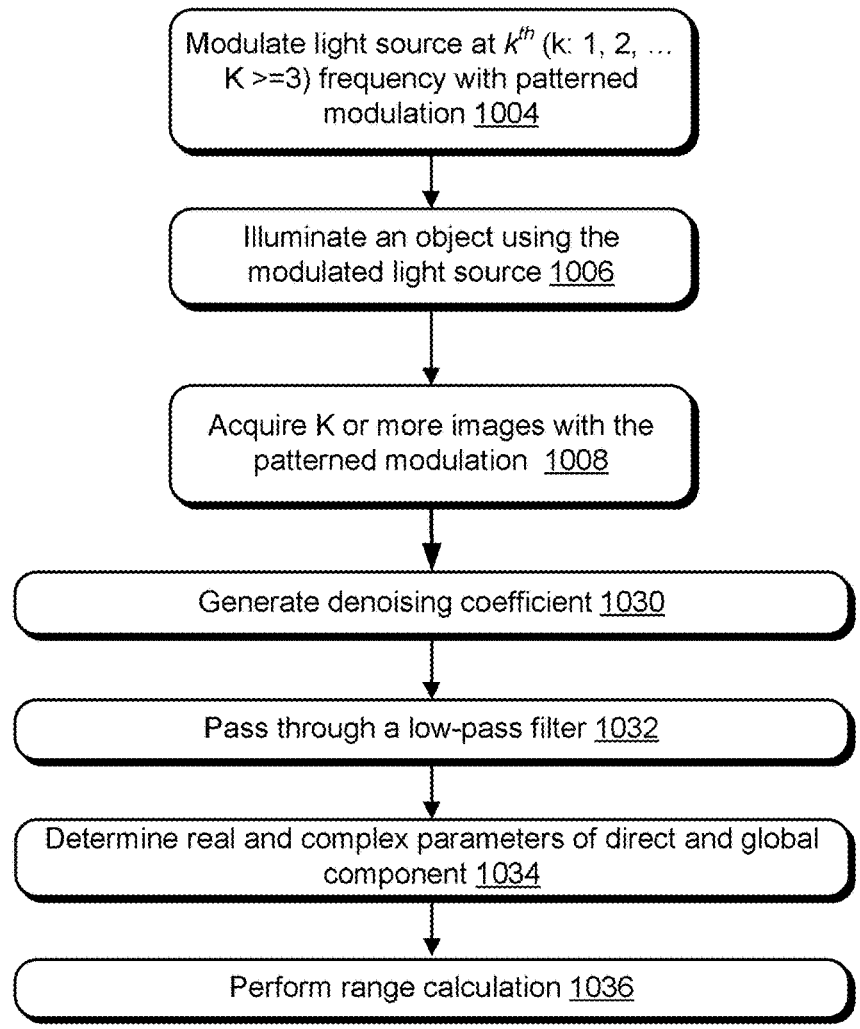
FIG. 10 illustrates example operations for multipath mitigation according to the implementation disclosed in FIG. 9.

FIG. 10 illustrates example operations 1000 for multipath mitigation according to the implementation disclosed in FIG. 9. Specifically, FIG. 10 illustrates example operations 1000 for separating the direct component of the light from the global component that contains the multipath. One or more operations 1000 may be performed by the image analyzer 930 disclosed in FIG. 9. Specifically, an operation 1004 modulates a light source (such as the light source 910 of FIG. 9) using the spatial patterns (such as the uniform spatial patterns 934 of FIG. 9) from a pattern data store. In the illustrated implementation, the operation 1004 modulates the light source with the spatial patterns 934 and temporally modulates the light signal with k different frequencies. For example, k may be equal to three. An operation 1006 illuminates an object (such as the object 950 of FIG. 9) using the modulated light source. The modulated light is scattered from the object towards a camera (such as the camera 920 of FIG. 9). An operation 1008 acquires k images where the object is illuminated with the light source being modulated with the spatial pattern 934 and k modulation frequencies. Each of the k images may be in the form of a matrix with each observation of the matrix corresponding to individual pixels of the camera 920.

An operation 1030 generates a denoising coefficient (m,n) to increase the signal to noise ratio (SNR) as discussed above with respect to the denoising module 640. An LPF, such as the LPF 944, is applied to the output by an operation 1032. Subsequently, an operation 1034 determines the real and the complex parameters of the direct and global components of the light using the calculation discussed below:

$$\text{Direct}\begin{cases}\overline{D}_r(i,j,K) = \sum_{m=-M}^{M}\sum_{n=-N}^{N}\xi\{m,n\}\dfrac{-P_r(m,n,k) + C \cdot P_r^{LP}(m,n,k)}{C - \gamma(m,n)} \\ \overline{D}_c(i,j,k) = \sum_{m=-M}^{M}\sum_{n=-N}^{N}\xi\{m,n\}\dfrac{-P_c(m,n,k) + C \cdot P_c^{LP}(m,n,k)}{C - \gamma(m,n)}\end{cases}$$

$$\text{Global}\begin{cases}\overline{G}_r(i,j,K) = \sum_{m=-M}^{M}\sum_{n=-N}^{N}\xi\{m,n\}\dfrac{-P_r(m,n,K) + \gamma(m,n) \cdot P_r^{LP}(m,n,k)}{C - \gamma(m,n)} \\ \overline{G}_c(i,j,k) = \sum_{m=-M}^{M}\sum_{n=-N}^{N}\xi\{m,n\}\dfrac{-P_c(m,n,K) + \gamma(m,n) \cdot P_c^{LP}(m,n,k)}{C - \gamma(m,n)}\end{cases}$$

Finally an operation 1036 performs one or more range calculation operations.

Figure 11:
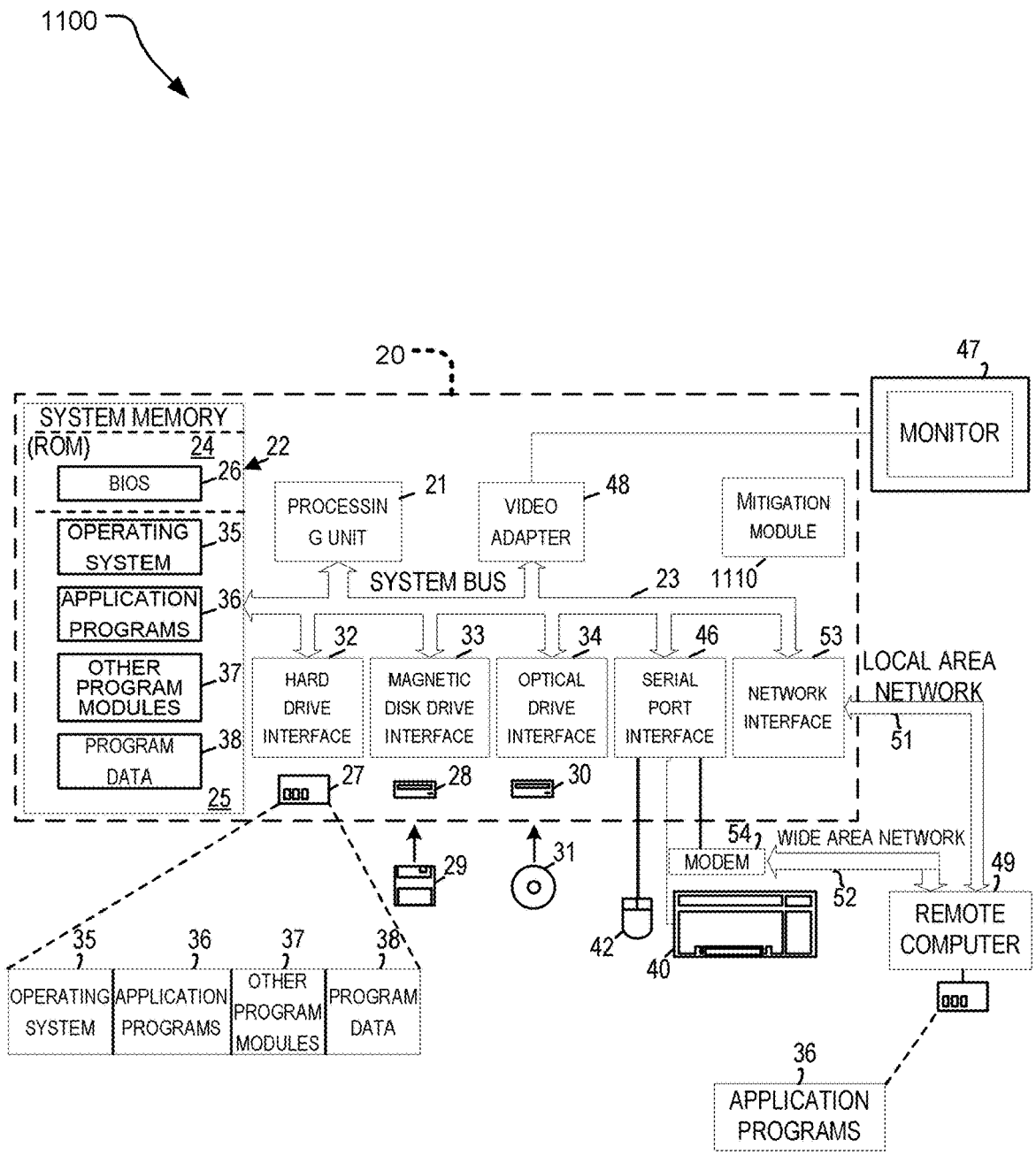
FIG. 11 illustrates an example computing system that may be used to implement the technology disclosed herein.

FIG. 11 illustrates an example system 1200 that may be useful in implementing the described ToF system disclosed herein. The example hardware and operating environment of FIG. 11 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 11, for example, the computer 20 includes a processing unit 21, a system memory 22, and a system bus 23 that operatively couples various system components including the system memory to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk drive 29, optical disk drive 31, ROM 24, or RAM 25, including an operating system 35, one or more application programs 36, other program modules 37, and program data 38. A user may generate reminders on the computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-network environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are for example and other means of communications devices for establishing a communications link between the computers may be used.

In an example implementation, software or firmware instructions for doing multipath mitigation as disclosed in FIGS. 2 and 4 may be stored in system memory 22 and/or storage devices 29 or 31 and processed by the processing unit 21. One of more of the patterns 132 and 134 disclosed in FIG. 1 may be stored in system memory 22 and/or storage devices 29 or 31 as persistent datastores. The computer 20 also includes a mitigation module 1110 that may be used to receive sampled light signals from a camera (such as the camera 120 of FIG. 1) and process the sampled signals to determine the direct component and the global component of the light signal. The mitigation module 1110 may include an image analyzer such as the image analyzer 130 disclosed in FIG. 1.

A physical hardware system to provide multipath mitigation in a time-of-flight (ToF) system includes a camera configured to acquire two or more images represented by two or more matrices in response to illuminating a target with a light source using a first spatial pattern at two or more different light frequencies and to acquire an additional image represented by an additional matrix in response to illuminating the target with the light source using a second spatial pattern, the second spatial pattern being different than the first spatial pattern, a denoising module configured to generate a denoising coefficient based on a kernel matrix, and an image analyzer to apply the denoising coefficient to the two or more matrices and the additional matrix and to determine one or more parameters of a direct component of light and a global component of light received at the camera from the target.

In one implementation, the first spatial pattern is a uniform spatial pattern. In an alternative implementation, the second spatial pattern is a non-uniform spatial pattern. Yet alternatively, each of the first spatial pattern and the second spatial pattern is a non-uniform spatial pattern. In one implementation, the additional image is acquired in response to illuminating the target with the light source using the second spatial pattern at a light frequency similar to one of the two or more different light frequencies used when illuminating the target with the first spatial pattern.

In another implementation, the camera is further configured to acquire three or more images represented by three or more matrices in response to illuminating the target with the light source using the first spatial pattern at three or more different light frequencies. Alternatively, the non-uniform spatial pattern is at least one of a dot-pattern, a vertical-line pattern, and a horizontal line pattern. Yet alternatively, the kernel matrix is an m×n matrix with m being different than n.

A method of separating a direct component of light collected by a time of flight (ToF) detector from a global component of light collected by the ToF detector includes acquiring three or more images represented by three or more matrices in response to illuminating a target with a light source using a first spatial pattern at three or more different modulation frequencies, acquiring an additional image represented by an additional matrix in response to illuminating the target with the light source using a second spatial pattern, the second spatial pattern being different than the first spatial pattern, generate a denoising coefficient based on a kernel matrix, and applying the denoising coefficient to the two or more matrices and the additional matrix and to determine one or more parameters of the direct component of light and the global component of light based on analysis of the three or more matrices and the additional matrix.

In one implementation, the first spatial pattern is a uniform spatial pattern. Alternatively, the second spatial pattern is a non-uniform spatial pattern. Yet alternatively, each of the first spatial pattern and the second spatial pattern is a non-uniform spatial pattern. In another implementation, the additional image is acquired in response to illuminating the target with the light source using the second spatial pattern at a light frequency similar to a one of the three or more different light frequencies used when illuminating the target with the first spatial pattern. Alternatively, the non-uniform spatial pattern is at least one of a dot-pattern, a vertical-line pattern, and a horizontal line pattern. Yet alternatively, the kernel matrix is an m×n matrix with m being different than n.

A physical article of manufacture including one or more tangible computer-readable storage media, encoding computer-executable instructions for executing on a computer system a computer process, the computer process including acquiring two or more images represented by three or more matrices in response to illuminating a target with a light source using a first spatial pattern at two or more different modulation frequencies, acquiring an additional image represented by an additional matrix in response to illuminating the target with the light source using a second spatial pattern, the second spatial pattern being different than the first spatial pattern, generating a denoising coefficient based on a kernel matrix, and applying the denoising coefficient to the two or more matrices and the additional matrix and to determine one or more parameters of the direct component of light and the global component of light based on analysis of the three or more matrices and the additional matrix.

In an alternative implementation, the first spatial pattern is a uniform spatial pattern and the second spatial pattern is a non-uniform spatial pattern. Yet alternatively, the process further includes performing a frequency conversion operation to transform a phase into a frequency K. Yet alternatively, each of the first spatial pattern and the second spatial pattern is a non-uniform spatial pattern. Alternatively, the light source illuminates a target using N temporal modulation frequencies with the uniform spatial pattern and N temporal modulation frequencies with the non-uniform spatial pattern.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The system for secure data onboarding may include a variety of tangible computer-readable storage media and intangible computer-readable communication signals. Tangible computer-readable storage can be embodied by any available media that can be accessed by the ToF system disclosed herein and includes both volatile and non-volatile storage media, removable and non-removable storage media. Tangible computer-readable storage media excludes intangible and transitory communications signals and includes volatile and non-volatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the ToF system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

The ToF system including multipath mitigation, as disclosed herein provides solution to a technological problem necessitated by the requirements of highly accurate depth perception information. Specifically, the multipath mitigation system disclosed herein provides an unconventional technical solution to this technological problem by providing a system and method that allows for efficient determination of parameters of direct component in a light signal received at a pixel of a camera and parameters of global component in the light signal received at a pixel of a camera by modulating a light source with pattern to generate patterned source light.

A physical hardware system to provide multipath mitigation in a time-of-flight (ToF) system includes a camera configured to acquire a first image represented by a first matrix in response to illuminating a target with a light source using a first spatial pattern and to acquire a second image represented by a second matrix in response to illuminating the target with the light source using a second spatial pattern, the second spatial pattern being different than the first spatial pattern and an image analyzer to analyze the first matrix and the second matrix to determine one or more parameters of a direct component of light and a global component of light received at the camera from the target.

In one implementation of the physical hardware system the first spatial pattern is a uniform spatial pattern. In an alternative implementation of the physical hardware system, second spatial pattern is a non-uniform spatial pattern. In yet another implementation, each of the first spatial pattern and the second spatial pattern is a non-uniform spatial pattern. In one implementation, the light source illuminates a target using N temporal modulation frequencies with the first spatial pattern and one temporal modulation frequency with the second spatial pattern. Alternatively, the light source illuminates a target using N temporal modulation frequencies with the first spatial pattern and N temporal modulation frequency with the second spatial pattern. Yet alternatively, the non-uniform spatial pattern is at least one of a dot-pattern, a vertical-line pattern, and a horizontal line pattern.

A method of separating a direct component of light collected by a time of flight (ToF) detector from a global component of light collected by the ToF detector, includes acquiring a first image represented by a first matrix in response to illuminating a target with a light source using a first spatial pattern, acquiring a second image represented by a second matrix in response to illuminating the target with the light source using a second spatial pattern, the second spatial pattern being different than the first spatial pattern, and determining one or more parameters of the direct component of light and the global component of light based on analysis of the first matrix and the second matrix. In one implementation of the method, the first spatial pattern is a uniform spatial pattern. In another implementation, the second spatial pattern is a non-uniform spatial pattern.

Alternatively, each of the first spatial pattern and the second spatial pattern is a non-uniform spatial pattern. Yet alternatively, the light source illuminates a target using N temporal modulation frequencies with the first spatial pattern and one temporal modulation frequency with the second spatial pattern. In an alternative implementation, the non-uniform spatial pattern is one of a dot-pattern, a vertical line pattern, and a horizontal line pattern.

A physical article of manufacture including one or more tangible computer-readable storage media, encoding computer-executable instructions for executing on a computer system a computer process, the computer process includes acquiring a first image represented by a first matrix in response to illuminating a target with a light source using a first spatial pattern, acquiring a second image represented by a second matrix in response to illuminating the target with the light source using a second spatial pattern, the second spatial pattern being different than the first spatial pattern, and determining one or more parameters of the direct component of light and the global component of light based on analysis of the first matrix and the second matrix In one implementation, the first spatial pattern is a uniform spatial pattern and the second spatial pattern is a non-uniform spatial pattern. Alternatively, the light source illuminates a target using N temporal modulation frequencies with the uniform spatial pattern and one temporal modulation frequency with the non-uniform spatial pattern. Yet alternatively, each of the first spatial pattern and the second spatial pattern is a non-uniform spatial pattern. In one implementation, the light source illuminates a target using N temporal modulation frequencies with the uniform spatial pattern and N temporal modulation frequencies with the non-uniform spatial pattern.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical hardware system to provide multipath mitigation in a time-of-flight (ToF) system, comprising:
    a camera configured to acquire k images, k being two or more, represented by k matrices in response to illuminating a target with a light source using a first spatial pattern at k different light frequencies and to acquire an additional $k+1^{th}$ image represented by an additional matrix in response to illuminating the target with the light source using a second spatial pattern, the second spatial pattern being different than the first spatial pattern;
    a denoising module configured to generate a denoising coefficient matrix based on a kernel matrix applied to each of the k+1 images; and
    an image analyzer to apply the denoising coefficient to the two or more matrices and the additional $k+1^{th}$ matrix and to determine one or more parameters of a direct component of light and a global component of light received at the camera from the target.

2. The physical hardware system of claim 1, wherein the first spatial pattern is a uniform spatial pattern.

3. The physical hardware system of claim 1, wherein the second spatial pattern is a non-uniform spatial pattern.

4. The physical hardware system of claim 1, wherein each of the first spatial pattern and the second spatial pattern is a non-uniform spatial pattern.

5. The physical hardware system of claim 1, wherein the additional image is acquired in response to illuminating the target with the light source using the second spatial pattern at a light frequency similar to one of the two or more different light frequencies used when illuminating the target with the first spatial pattern.

6. The physical hardware system of claim 1, wherein the camera is further configured to acquire three or more images represented by three or more matrices in response to illuminating the target with the light source using the first spatial pattern at three or more different light frequencies.

7. The physical hardware system of claim 1, wherein the non-uniform spatial pattern is at least one of a dot-pattern, a vertical-line pattern, and a horizontal line pattern.

8. The physical hardware system of claim 1, wherein the kernel matrix is an m×n matrix with m being different than n.

9. A method of separating a direct component of light collected by a time of flight (ToF) detector from a global component of light collected by the ToF detector, the method comprising:
    acquiring k images, k being two or more, represented by k matrices in response to illuminating a target with a light source using a first spatial pattern at k different modulation frequencies;
    acquiring an additional $k+1^{th}$ image represented by an additional matrix in response to illuminating the target with the light source using a second spatial pattern, the second spatial pattern being different than the first spatial pattern;
    generate a denoising coefficient matrix based on a kernel matrix applied to each of the k+1 images; and
    applying the denoising coefficient to the two or more matrices and the additional $k+1^{th}$ matrix and to determine one or more parameters of the direct component of light and the global component of light based on analysis of the three or more matrices and the additional matrix.

10. The method of claim 9, wherein the first spatial pattern is a uniform spatial pattern.

11. The method of claim 9, wherein the second spatial pattern is a non-uniform spatial pattern.

12. The method of claim 9, wherein each of the first spatial pattern and the second spatial pattern is a non-uniform spatial pattern.

13. The method of claim 9, wherein the additional image is acquired in response to illuminating the target with the light source using the second spatial pattern at a light frequency similar to a one of the three or more different light frequencies used when illuminating the target with the first spatial pattern.

14. The method of claim 9, wherein the non-uniform spatial pattern is at least one of a dot-pattern, a vertical-line pattern, and a horizontal line pattern.

15. The method of claim 9, wherein the kernel matrix is an m×n matrix with m being different than n.

16. A physical article of manufacture including one or more non-transitory computer-readable storage media, encoding computer-executable instructions for executing on a computer system a computer process, the computer process comprising:
acquiring k images, k being two or more, represented by k matrices in response to illuminating a target with a light source using a first spatial pattern at k different modulation frequencies;
acquiring an additional k+1$^{th}$ image represented by an additional matrix in response to illuminating the target with the light source using a second spatial pattern, the second spatial pattern being different than the first spatial pattern;
generating a denoising coefficient matrix based on a kernel matrix applied to each of the k+1 images; and
applying the denoising coefficient to the two or more matrices and the additional k+1$^{th}$ matrix and to determine one or more parameters of the direct component of light and the global component of light based on analysis of the three or more matrices and the additional matrix.

17. The physical article of manufacture of claim 16, wherein the first spatial pattern is a uniform spatial pattern and the second spatial pattern is a non-uniform spatial pattern.

18. The physical article of manufacture of claim 17, wherein the process further comprising performing a frequency conversion operation to transform a phase into a frequency K.

19. The physical article of manufacture of claim 17, wherein each of the first spatial pattern and the second spatial pattern is a non-uniform spatial pattern.

20. The physical article of manufacture of claim 19, wherein the light source illuminates a target using N temporal modulation frequencies with the uniform spatial pattern and N temporal modulation frequencies with the non-uniform spatial pattern.

* * * * *